(12) United States Patent
Yamaguchi et al.

(10) Patent No.: US 12,186,956 B2
(45) Date of Patent: Jan. 7, 2025

(54) PLASTICIZING DEVICE, THREE-DIMENSIONAL SHAPING DEVICE, AND INJECTION MOLDING DEVICE

(71) Applicant: Seiko Epson Corporation, Tokyo (JP)

(72) Inventors: Juri Yamaguchi, Matsumoto (JP); Shohei Onodera, Akumi (JP); Seiichiro Yamashita, Yokohama (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/752,984

(22) Filed: May 25, 2022

(65) Prior Publication Data

US 2022/0379536 A1 Dec. 1, 2022

(30) Foreign Application Priority Data

May 26, 2021 (JP) .................................. 2021-088217

(51) Int. Cl.
*B29C 45/46* (2006.01)
*B29C 45/50* (2006.01)
(Continued)

(52) U.S. Cl.
CPC .......... *B29C 45/60* (2013.01); *B29C 45/5008* (2013.01); *B29C 45/62* (2013.01);
(Continued)

(58) Field of Classification Search
None
See application file for complete search history.

(56) References Cited

U.S. PATENT DOCUMENTS 3,248,755 A * 5/1966 Plymale .................. B29C 48/47
264/211.1
11,077,615 B2 8/2021 Yamasaki et al.
(Continued)

FOREIGN PATENT DOCUMENTS

JP 2010-241016 A 10/2010
JP 2020-015219 A 1/2020
JP 2020-049730 A 4/2020

OTHER PUBLICATIONS

Bishop, Thomas; Selecting the Correct Bearing Seal, Feb. 25, 2014, Efficient Plant. <https://www.efficientplantmag.com/2014/02/selecting-the-correct-bearing-seal/> (Year: 2014).*

*Primary Examiner* — Armand Melendez
(74) *Attorney, Agent, or Firm* — Harness, Dickey & Pierce, P.L.C.

(57) ABSTRACT

A plasticizing device includes: a flat screw that has a groove forming surface on which a spiral first groove is formed, and that rotates; a barrel that has a facing surface facing the groove forming surface and that includes a communication hole through which a plasticizing material flows; a heater that heats resin pellets; and a screw case that accommodates the flat screw and that includes a passage port through which the resin pellets pass toward the flat screw, in which the flat screw has a first side surface on which a first supply port for supplying the resin pellets to the first groove is formed and a second side surface formed on a side farther from the barrel than the first side surface, and a first distance, which is a shortest distance between the first side surface and the screw case, is larger than a second distance, which is a shortest distance between the second side surface and the screw case.

15 Claims, 9 Drawing Sheets

(51) Int. Cl.
  *B29C 45/60* (2006.01)
  *B29C 45/62* (2006.01)
  *B29C 45/74* (2006.01)
  *B29C 64/209* (2017.01)
  *B29C 64/314* (2017.01)
  *B33Y 10/00* (2015.01)
  *B33Y 40/10* (2020.01)

(52) U.S. Cl.
  CPC ............ *B29C 45/74* (2013.01); *B29C 64/209* (2017.08); *B29C 64/314* (2017.08); *B33Y 10/00* (2014.12); *B33Y 40/10* (2020.01)

(56) References Cited

U.S. PATENT DOCUMENTS

| | | | |
|---|---|---|---|
| 2006/0182887 A1* | 8/2006 | Miller | B29B 13/022 427/256 |
| 2020/0031037 A1 | 1/2020 | Hideshima | |
| 2020/0094476 A1* | 3/2020 | Yamasaki | B33Y 40/10 |

* cited by examiner

PLASTICIZING DEVICE, THREE-DIMENSIONAL SHAPING DEVICE, AND INJECTION MOLDING DEVICE

The present application is based on, and claims priority from JP Application Serial Number 2021-088217, filed May 26, 2021, the disclosure of which is hereby incorporated by reference herein in its entirety.

BACKGROUND

1. Technical Field

The present disclosure relates to a plasticizing device, a three-dimensional shaping device, and an injection molding device.

2. Related Art

A plasticizing device for plasticizing a material is used for a three-dimensional shaping device of a fused deposition modeling method and an injection molding device. In a plasticizing device disclosed in JP-A-2010-241016, a rotor as a flat screw and a barrel are disposed to face each other. The rotor has a substantially circular plate shape, and includes a spiral groove formed on a surface orthogonal to a rotation shaft based on an involute curve. The rotor is rotated by a motor.

The barrel includes a heater that melts resin pellets and a flow path through which melted resin materials pass. The resin pellets are melted and pressurized in the spiral groove. The melted and pressurized resin materials are pressed into the flow path of the barrel.

The rotor is disposed in a casing as a screw case. The casing includes a supply port for supplying the resin pellets to the rotor. The resin pellets are charged into the spiral groove that opens from the supply port to a side surface on an outer peripheral side of the rotor.

In the plasticizing device disclosed in JP-A-2010-241016, a gap between the side surface of the rotor and the casing is shorter than a length of the resin pellets. The rotor rotates with respect to the casing. Therefore, an area where the supply port of the casing and the opening of the spiral groove overlap each other is widened and then narrowed and closed. When there are the resin pellets between the supply port of the casing and the opening of the spiral groove, the resin pellets are sandwiched and divided between the casing and the rotor. A part of the divided resin pellets enters the gap between the side surface of the rotor and the casing and is crushed. Since the crushed resin pellets inhibit a rotation of the rotor, there is a problem that stable plasticization is not possible. Therefore, there is a demand for the plasticizing device in which the resin pellets are less likely to be divided between the casing and the rotor.

SUMMARY

A plasticizing device includes: a motor; a flat screw that has a groove forming surface on which a spiral groove is formed and that rotates around a rotation shaft of the motor; a barrel that has a facing surface facing the groove forming surface and that is provided with a communication hole through which a plasticizing material obtained by plasticizing a material flows; a heater that heats the material supplied between the groove forming surface and the facing surface; and a screw case that accommodates the flat screw and that includes a passage port through which the material passes toward the flat screw, in which when viewed from a direction perpendicular to the rotation shaft of the motor, the flat screw has a first side surface in which a supply port for supplying the material to the groove is partially formed, and a second side surface formed on a side farther from the barrel than the first side surface, and a first distance, which is a shortest distance between the first side surface and the screw case, is larger than a second distance, which is a shortest distance between the second side surface and the screw case.

A three-dimensional shaping device includes: the plasticizing device described above; a nozzle that discharges the plasticizing material supplied from the plasticizing device; and a stage that receives the plasticizing material discharged from the nozzle.

An injection molding device includes: the plasticizing device described above; and a nozzle that injects the plasticizing material supplied from the plasticizing device toward a mold.

DESCRIPTION OF EXEMPLARY EMBODIMENTS

First Embodiment

Figure 1:
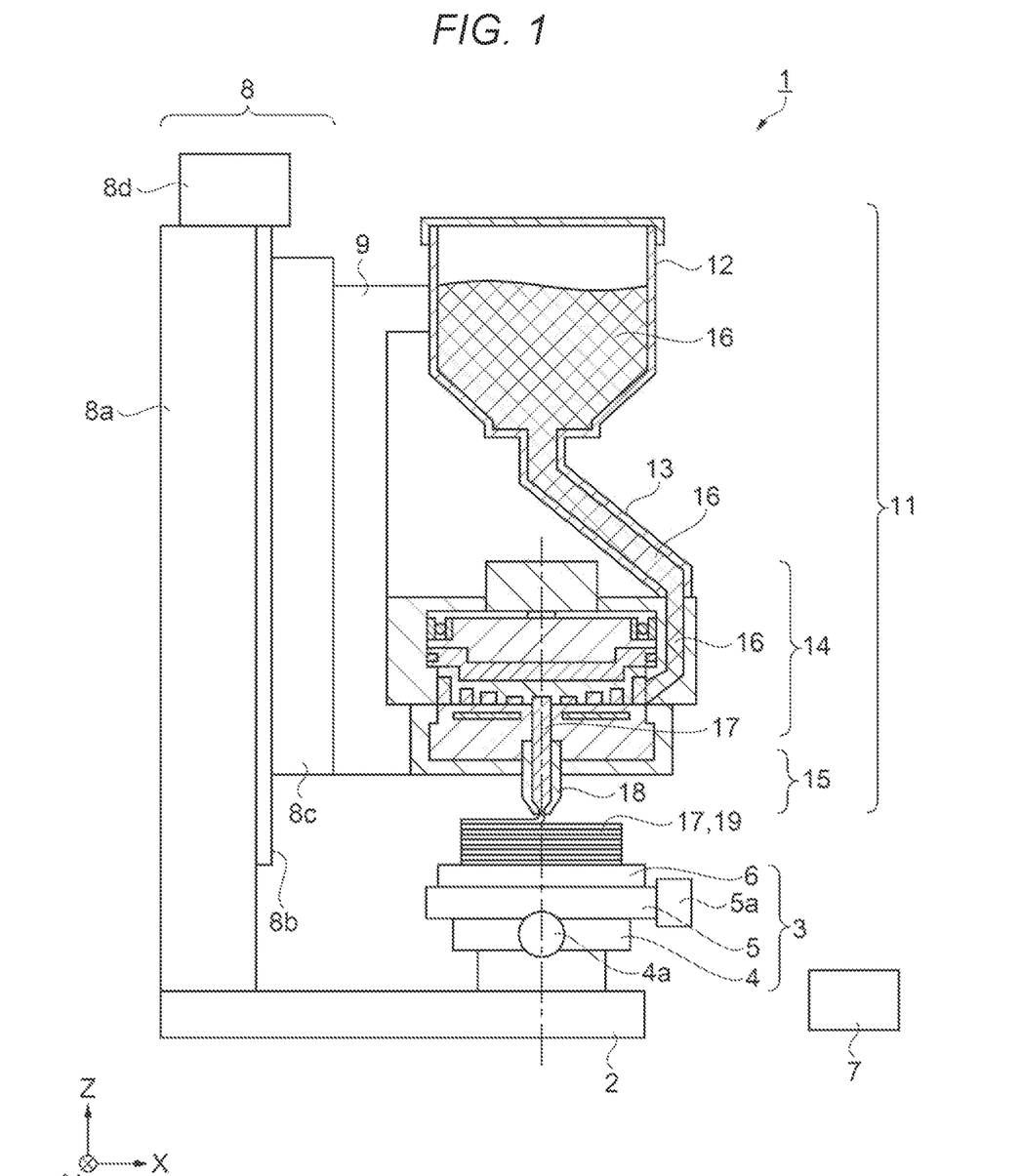
FIG. 1 is a schematic diagram showing a configuration of a three-dimensional shaping device according to a first embodiment.

In a first embodiment, a characteristic example of a three-dimensional shaping device including a plasticizing device will be described with reference to the drawings. In FIG. 1, arrows along X, Y, and Z directions orthogonal to each other are shown. The X direction and the Y direction are directions along a horizontal direction, and the Z direction is a direction along a vertical direction. A gravity direction is a Z negative direction.

As shown in FIG. 1, a three-dimensional shaping device 1 includes a base 2. A stage 3 is installed at the base 2. At the stage 3, a Y stage 4, an X stage 5, and a receiving plate 6 are stacked in this order in a Z positive direction.

The Y stage 4 includes a Y axis motor 4a, a ball screw, a Y axis scale, and the like. The Y stage 4 reciprocates the receiving plate 6 in the Y direction. The X stage 5 includes an X axis motor 5a, a ball screw, an X axis scale, and the like. The X stage 5 reciprocates the receiving plate 6 in the X direction.

The three-dimensional shaping device 1 includes a control unit 7. The control unit 7 controls movements of the Y stage 4 and the X stage 5. The control unit 7 recognizes a position of the receiving plate 6 in the Y direction based on information output by the Y axis scale. The control unit 7 recognizes a position of the receiving plate 6 in the X direction based on information output by the X axis scale. The control unit 7 moves the Y stage 4 and the X stage 5 such that a difference between a target position for moving the receiving plate 6 and a current position is eliminated. The control unit 7 controls a trajectory of a movement of the receiving plate 6 by sequentially changing the target position for moving the receiving plate 6.

An elevating stage 8 is installed on an X negative direction side at the base 2. The elevating stage 8 includes a fixed table 8a, and the fixed table 8a is erected at the base 2. A rail 8b is installed on a surface of the fixed table 8a on an X positive direction side. A movement table 8c is installed on the X positive direction side of the rail 8b. The movement table 8c reciprocates in the Z direction along the rail 8b.

A Z axis motor 8d is installed on a Z positive direction side of the fixed table 8a. The fixed table 8a includes a ball screw and a Z axis scale inside. Similarly to the Y stage 4 and the X stage 5, the control unit 7 controls a trajectory of a movement of the movement table 8c.

A unit support portion 9 is installed on the X positive direction side of the movement table 8c. A shaping unit 11 is installed on the X positive direction side of the unit support portion 9, and the unit support portion 9 supports the shaping unit 11. In the shaping unit 11, a material supply portion 12, a coupling pipe 13, a plasticizing device 14, and a discharge portion 15 are installed in this order in the Z negative direction.

In the present embodiment, there is a configuration in which the stage 3 moves in the X direction and the Y direction, and the shaping unit 11 moves in the Z direction, a configuration may be possible in which the stage 3 does not move, and the shaping unit 11 moves in the X, Y, and Z directions, or a configuration may be possible in which the stage 3 moves in the Z direction, and the shaping unit 11 moves in the X direction and the Y direction.

The material supply portion 12 is a container including a cavity inside. Resin pellets 16 as materials are accommodated inside the material supply portion 12. The resin pellets 16 are lumps of resin. A size of the resin pellets 16 is not particularly limited, and in the present embodiment, the size is, for example, in a range of 5 mm to 20 mm.

The coupling pipe 13 is coupled to a bottom of the material supply portion 12. The resin pellets 16 move from the inside of the material supply portion 12 into the coupling pipe 13 due to a weight thereof. The coupling pipe 13 is coupled to the plasticizing device 14. The resin pellets 16 are supplied from the coupling pipe 13 to the plasticizing device 14.

The plasticizing device 14 plasticizes the resin pellets 16. A term "plasticization" is a concept including melting, and is a change from a solid to a state having fluidity. Specifically, for a material that undergoes a glass transition, the plasticization is to raise a temperature of the material to be equal to or higher than a glass transition point. For a material that does not undergo the glass transition, the "plasticization" is to raise the temperature of the material to be equal to or higher than a melting point. The plasticizing device 14 plasticizes the resin pellets 16 into a plasticizing material 17.

The three-dimensional shaping device 1 includes a nozzle 18. The nozzle 18 discharges the plasticizing material 17 supplied from the plasticizing device 14 to the receiving plate 6. The receiving plate 6 of the stage 3 receives the plasticizing material 17 discharged from the nozzle 18. While the nozzle 18 discharges the plasticizing material 17, the control unit 7 moves the receiving plate 6 in the X direction and the Y direction. Accordingly, the three-dimensional shaping device 1 forms a figure of a predetermined pattern on the receiving plate 6. This figure is a figure of a first stage.

Next, the elevating stage 8 moves the shaping unit 11 by a predetermined distance in the Z positive direction. The three-dimensional shaping device 1 forms a figure of a second stage so as to be superimposed on the figure of the first stage. Further, the three-dimensional shaping device 1 forms a three-dimensional structure 19 by superimposing and forming figures of a third and subsequent stages.

Figure 2:
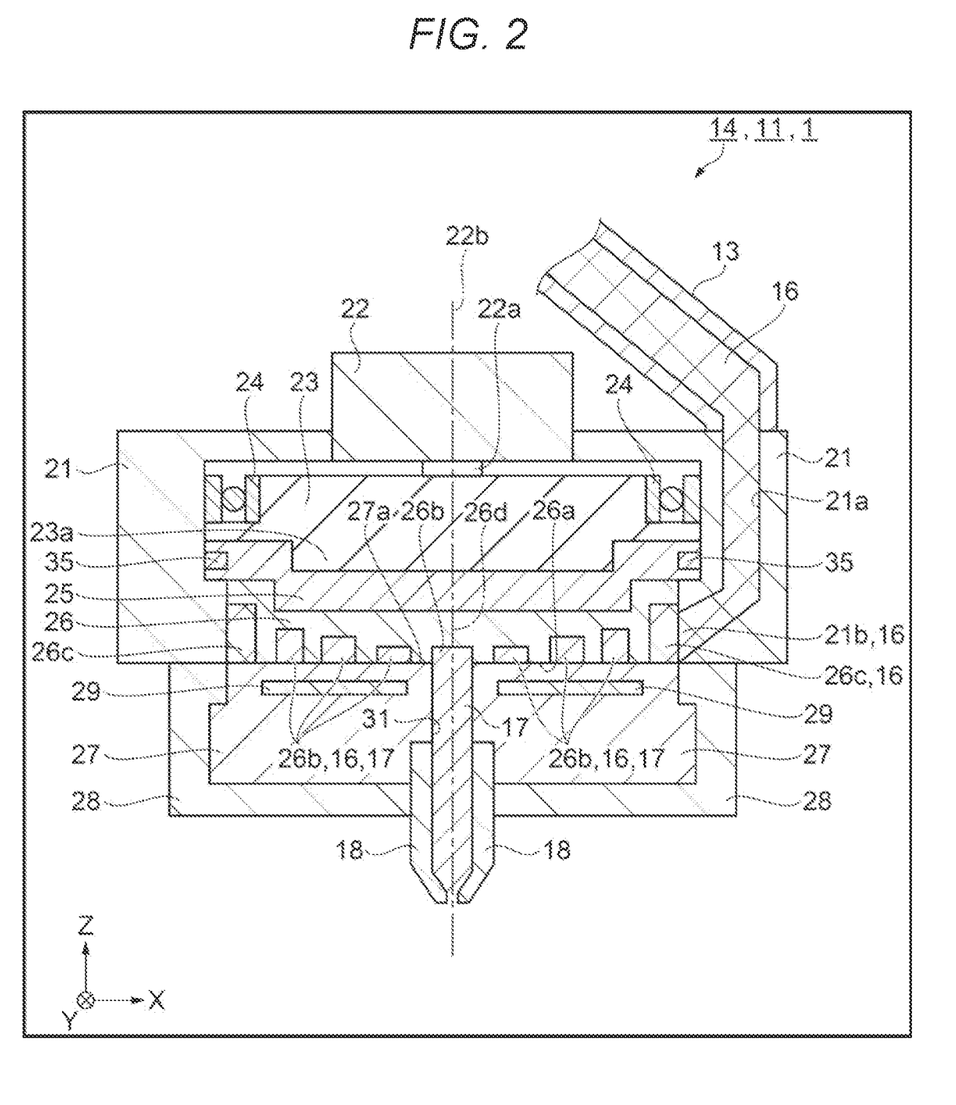
FIG. 2 is a schematic side sectional view showing a configuration of a plasticizing device.

As shown in FIG. 2, the plasticizing device 14 includes a screw case 21. An inside of the screw case 21 is hollow. A motor 22 is installed on the Z positive direction side of the screw case 21. The control unit 7 controls a rotation angle, a rotation speed, a rotation start timing, and a rotation stop timing of the motor 22.

A reduction gear 23 is coupled to a rotation shaft 22a of the motor 22. When the rotation shaft 22a rotates at a high speed, an outer peripheral side of the reduction gear 23 rotates at a reduced low speed. The outer peripheral side of the reduction gear 23, which rotates at the low speed, serves as an output shaft 23a. Bearings 24 are installed on the outer peripheral side of the reduction gear 23. The bearings 24 are disposed between the screw case 21 and the reduction gear 23. The bearings 24 rotatably support the reduction gear 23.

A screw support portion 25 is installed at the output shaft 23a of the reduction gear 23. A flat screw 26 is installed at the screw support portion 25. The flat screw 26 rotates in synchronization with the output shaft 23a. The flat screw 26 rotates about the rotation shaft 22a of the motor 22. A screw rotation center 26d, which is a rotation center of the flat screw 26, is coaxial with a motor rotation center 22b, which is a rotation center of the motor 22.

Figure 3:
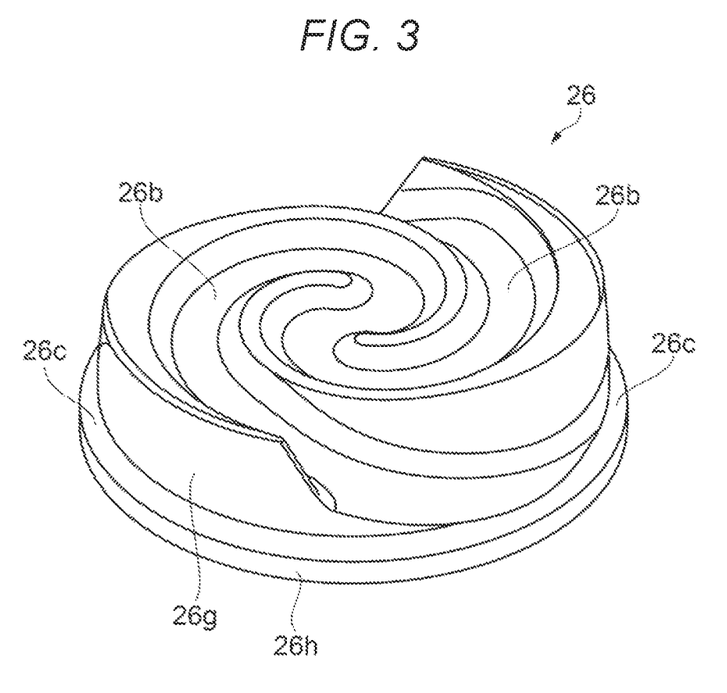
FIG. 3 is a schematic perspective view showing a configuration of a groove forming surface side of a flat screw.

As shown in FIGS. 2 and 3, the flat screw 26 has a groove forming surface 26a on which first grooves 26b are formed as spiral grooves. A ring-shaped second groove 26c is formed on outer peripheral sides of the first grooves 26b on the groove forming surface 26a. The flat screw 26 has a substantially cylindrical shape in which a size in a rotation shaft 22a direction is smaller than a size in a direction orthogonal to the rotation shaft 22a direction. In the illustrated example, two first grooves 26b are provided, but the number of the first grooves 26b is not particularly limited. Although not shown, three or more first grooves 26b may be provided, or only one first groove 26b may be provided.

The screw case 21 accommodates the reduction gear 23, the screw support portion 25, and the flat screw 26. The screw case 21 includes a supply path 21a coupled to the coupling pipe 13. The supply path 21a continues from the coupling pipe 13 to the flat screw 26. An opening of the supply path 21a on a flat screw 26 side is a passage port 21b. The screw case 21 is provided with the passage port 21b through which the resin pellets 16 pass toward the flat screw 26.

A barrel 27 is installed on a Z negative direction side of the flat screw 26. A barrel case 28 that accommodates the barrel 27 is installed on the Z negative direction side of the screw case 21. The flat screw 26 rotates with respect to the barrel 27.

A depth of the first groove 26b is shallower on a side closer to the screw rotation center 26d than on the outer peripheral side. Therefore, a cross-sectional area of the first groove 26b is smaller on the side closer to the screw rotation center 26d than on the outer peripheral side. The plasticizing material 17 in the first groove 26b has a high pressure on a screw rotation center 26d side and is pushed out to a communication hole 31. The flat screw 26 functions as a pump that moves the plasticizing material 17.

Figure 4:
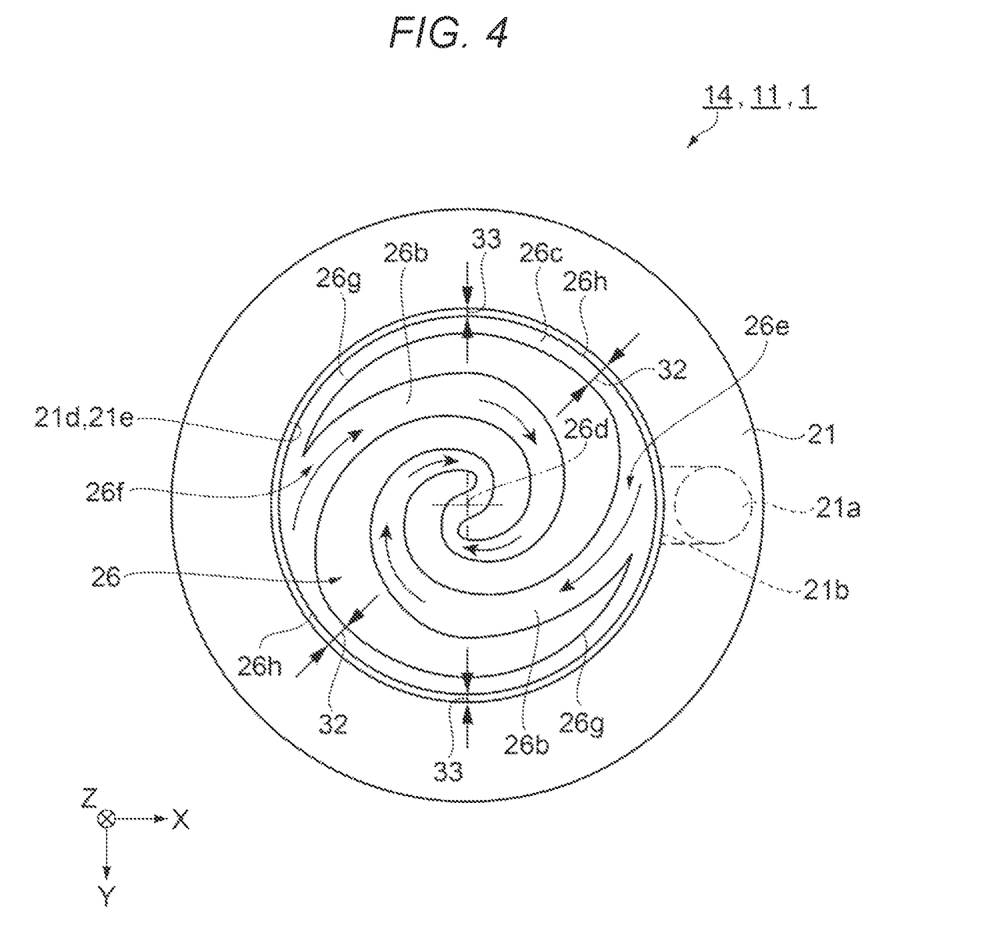
FIG. 4 is a schematic plan view illustrating a positional relationship between the flat screw and a screw case.
Figure 5:
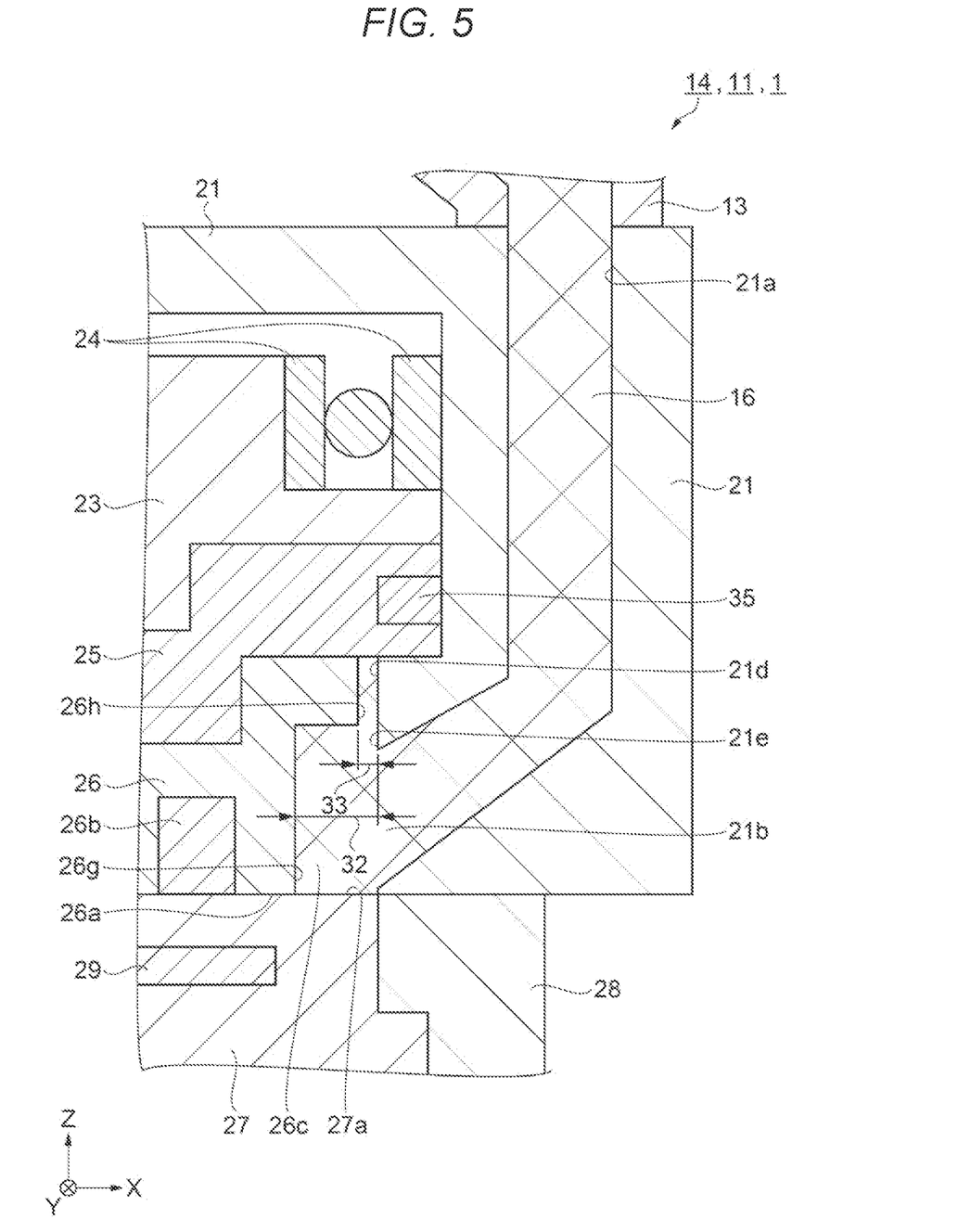
FIG. 5 is a schematic side sectional view of a main part illustrating the positional relationship between the flat screw and the screw case.

FIG. 4 is a view of the screw case 21 and the flat screw 26 as viewed from the Z negative direction side. FIG. 5 is a view of the screw case 21 and the flat screw 26 as viewed from a Y negative direction side. As shown in FIGS. 3, 4, and 5, when viewed from a direction perpendicular to the rotation shaft 22a of the motor 22, the flat screw 26 includes first side surfaces 26g in which a first supply port 26e as the supply port and a second supply port 26f as the supply port that supply the resin pellets 16 to the first grooves 26b are partially formed. The flat screw 26 includes a second side surface 26h formed on a side farther from the barrel 27 than the first side surfaces 26g. The first side surfaces 26g are surfaces located on the screw rotation center 26d side of the second groove 26c. The second side surface 26h is a surface located on a screw case 21 side of the second groove 26c. The screw case 21 includes a third side surface 21d facing the second side surface 26h. The screw case 21 includes a fourth side surface 21e facing the first side surface 26g. The third side surface 21d and the fourth side surface 21e have arcs having the same distance from the screw rotation center 26d.

A first distance 32, which is a shortest distance between the first side surface 26g and the screw case 21, is larger than a second distance 33, which is a shortest distance between the second side surface 26h and the screw case 21. The first distance 32 is a distance between the first side surface 26g and the fourth side surface 21e, and the second distance 33 is a distance between the second side surface 26h and the third side surface 21d.

As shown in FIGS. 2 and 5, the barrel 27 has a facing surface 27a facing the groove forming surface 26a. A heater 29 is installed inside the barrel 27 at a position facing the first grooves 26b. The heater 29 heats the resin pellets 16 supplied between the groove forming surface 26a and the facing surface 27a. The heated resin pellets 16 are plasticized to be the plasticizing material 17. The barrel 27 is provided with the communication hole 31 through which the plasticizing material 17 obtained by plasticizing the resin pellets 16 flows.

According to this configuration, the resin pellets 16 are supplied from the passage port 21b of the screw case 21 to the flat screw 26. In the flat screw 26, the resin pellets 16 travel from the first supply port 26e and the second supply port 26f to the spiral first grooves 26b. The resin pellets 16 are heated and plasticized in the spiral first grooves 26b. The plasticizing material 17 that is plasticized flows into the communication hole 31 of the barrel 27. Side surfaces of the flat screw 26 include the first side surfaces 26g and the second side surface 26h. Since a space between the second side surface 26h and the screw case 21 is short, the resin pellets 16 are less likely to enter. The first side surfaces 26g and the screw case 21 are separated from each other. The resin pellets 16 travel between the first side surface 26g and the screw case 21 from the passage port 21b of the screw case 21. The first supply port 26e and the second supply port 26f which communicate with the spiral first grooves 26b are disposed at the first side surfaces 26g. The resin pellets 16 travel from spaces between the first side surface 26g and the screw case 21 to the first supply port 26e and the second supply port 26f.

The screw case 21 and the second side surface 26h of the flat screw 26 rotate relative to each other by the motor 22. The resin pellets 16 pass between the first side surfaces 26g and the screw case 21 before entering the first supply port 26e and the second supply port 26f from the screw case 21. Since the first side surface 26g and the screw case 21 are separated from each other, it is possible to prevent the resin pellets 16 from being sandwiched and divided between the first side surfaces 26g of the flat screw 26 and the screw case 21. Therefore, since the resin pellets 16 are less likely to be crushed in the plasticizing device 14, it is possible to prevent the crushed resin pellets 16 from inhibiting a rotation of the flat screw 26.

The second side surface 26h projects further toward the screw case 21 side than the first side surface 26g. Since the second distance 33 is small, the resin pellets 16 are less likely to move toward a screw support portion 25 side. Therefore, the flat screw 26 can flow the resin pellets 16 into the first grooves 26b.

The first side surface 26g is closer to the rotation shaft 22a of the motor 22 than the second side surface 26h. According to this configuration, since the first side surface 26g is closer to the rotation shaft 22a of the motor 22 than the second side surface 26h, the first distance 32 between the first side surface 26g and the screw case 21 can be secured.

It is preferable that an area occupied by the first side surface 26g is larger than an area occupied by the second side surface 26h. According to this configuration, since the area occupied by the first side surface 26g is large, the first supply port 26e and the second supply port 26f can be enlarged. Since a space of the second groove 26c between the first side surface 26g and the screw case 21 is wide, the resin pellets 16 can be less likely to be crushed.

It is preferable that the first distance 32 is larger than a maximum length of the resin pellets 16. According to this configuration, since the shortest distance between the first side surface 26g and the screw case 21 is larger than the maximum length of the resin pellets 16, it is possible to prevent the resin pellets 16 from being pushed and crushed by the first side surface 26g and the screw case 21.

The plasticizing device 14 may plasticize the resin pellets 16 containing an elastomer resin. As the elastomer resin, polystyrene-based, olefin/alkene-based, polyvinyl chloride-based, polyurethane-based, polyester-based, polyamide-based and other elastomer resins are used. In the present embodiment, for example, the resin pellets 16 containing a polystyrene-based thermoplastic elastomer resin are used.

According to this configuration, even when the resin pellets 16 contain the elastomer resin, it is possible to prevent the resin pellets 16 from being pushed and crushed by the first side surface 26g and the screw case 21. As the resin pellets 16, an acrylic resin, an epoxy resin, a silicone resin, a cellulose-based resin, or other synthetic resins, polylactic acid, polyamide, polyphenylene sulfide, polyether ether ketone, or other thermoplastic resins may be used.

It is preferable that when the resin pellets 16 contain the elastomer resin, a difference between the first distance 32 and the second distance 33 is larger than when the resin pellets 16 do not contain the elastomer resin. According to this configuration, when the resin pellets 16 contain the elastomer resin, the first side surface 26g and the screw case 21 are separated from each other. Therefore, it is possible to further prevent the resin pellets 16 from being pushed and crushed by the first side surface 26g and the screw case 21.

Figure 6:
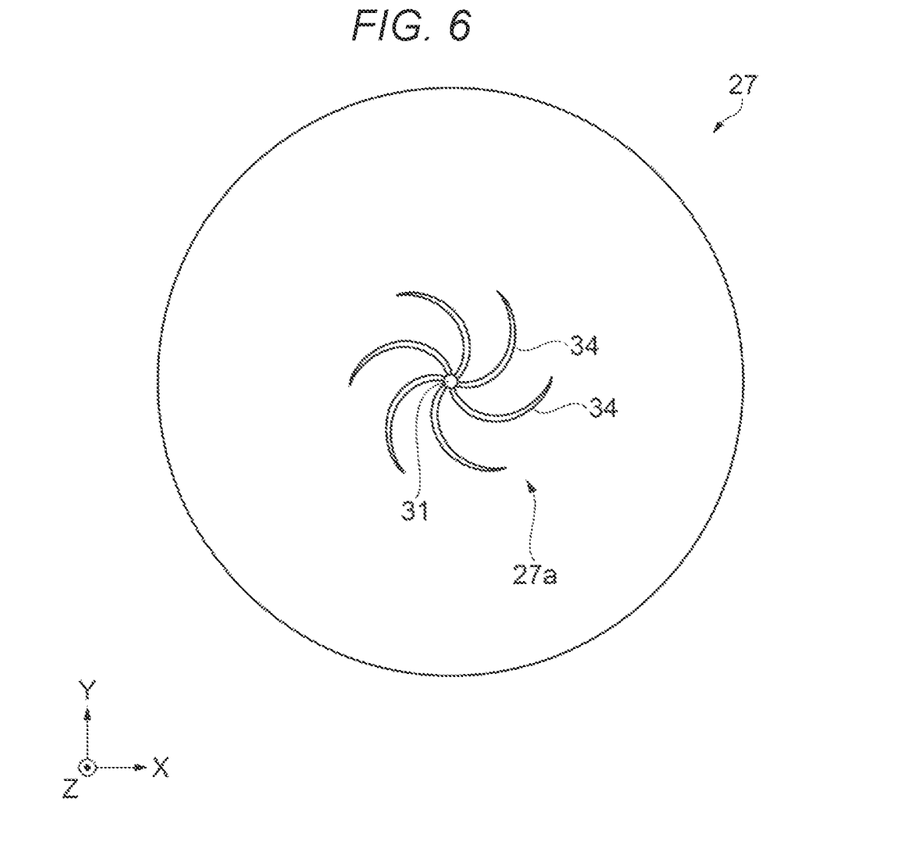
FIG. 6 is a schematic plan view showing a configuration of a barrel on a flat screw facing surface side.

FIG. 6 is a view of the barrel 27 as viewed from the flat screw 26 side. As shown in FIG. 6, a plurality of guide grooves 34 are formed around the communication hole 31 in the facing surface 27a. One end of each guide groove 34 is coupled to the communication hole 31, and the guide grooves 34 extend in a spiral shape from the communication hole 31 toward an outer periphery of the facing surface 27a. Each guide groove 34 guides the plasticizing material 17 to the communication hole 31. The guide grooves 34 may not be coupled to the communication hole 31, and the guide grooves 34 may not be formed in the facing surface 27a.

As shown in FIGS. 2 and 5, the plasticizing device is provided with the screw support portion 25 that supports the flat screw 26 on a motor 22 side of the flat screw 26. The plasticizing device 14 includes a seal portion 35 that narrows a gap between the screw support portion 25 and the screw case 21. The seal portion 35 is an elastic ring. A silicone resin, a rubber, or a spring steel may be used as a material of the seal portion 35. According to this configuration, the seal portion 35 narrows the gap between the screw support portion 25 and the screw case 21. Therefore, it is possible to prevent the resin pellets 16 from traveling to the motor 22 side.

According to this configuration of the three-dimensional shaping device 1, the three-dimensional shaping device 1 includes the above-described plasticizing device 14. In the plasticizing device 14 described above, since the resin pellets 16 are less likely to be crushed, it is possible to prevent the crushed resin pellets 16 from inhibiting the rotation of the flat screw 26. Therefore, the three-dimensional shaping device 1 can be a device including the plasticizing device 14 with high long-term reliability.

Second Embodiment

A second embodiment is different from the first embodiment in that the flat screw 26 does not include the second groove 26c, and the screw case 21 includes a portion corresponding to the second groove 26c. Same components as those of the first embodiment are denoted by the same reference numerals, and redundant description thereof will be omitted.

Figure 7:
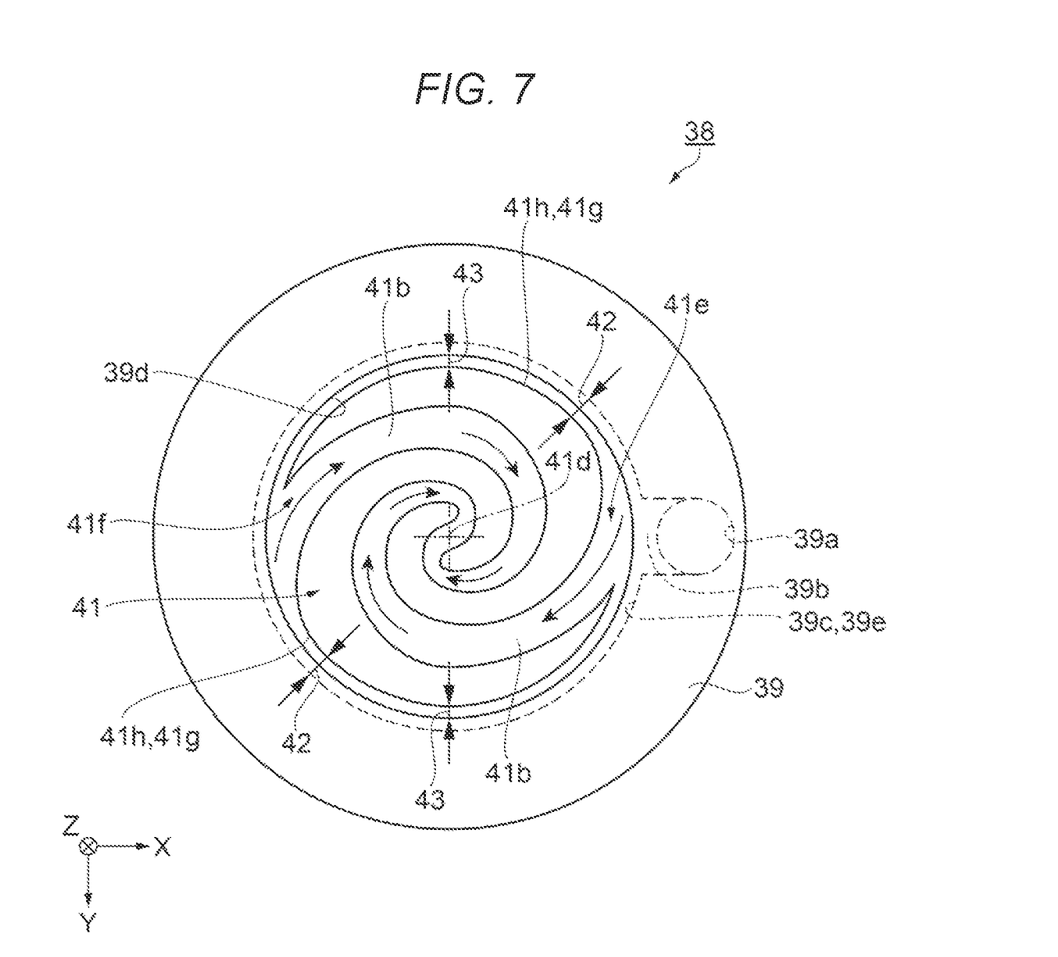
FIG. 7 is a schematic plan view illustrating a positional relationship between a flat screw and a screw case according to a second embodiment.
Figure 8:
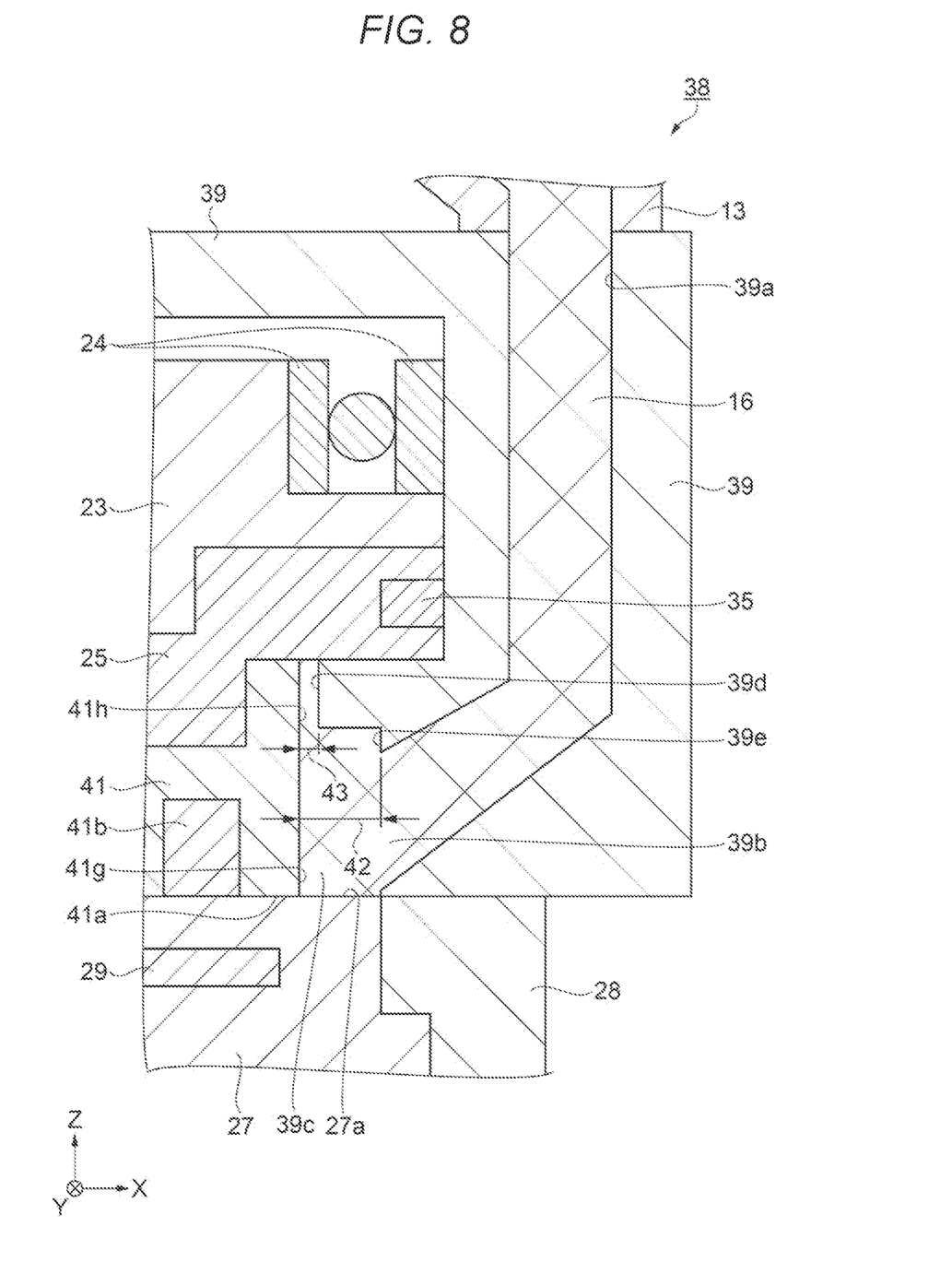
FIG. 8 is a schematic side sectional view of a main part illustrating the positional relationship between the flat screw and the screw case.

FIG. 7 is a view of a screw case 39 and a flat screw 41 included in a plasticizing device 38 as viewed from the Z negative direction side. FIG. 8 is a view of the screw case 39 and the flat screw 41 in the plasticizing device 38 as viewed from the Y negative direction side.

As shown in FIGS. 7 and 8, the screw case 39 accommodates the reduction gear 23, the screw support portion 25, and the flat screw 41. The screw case 39 includes a ring-shaped recess 39c at a position facing a side surface of the flat screw 41 on a barrel 27 side. The screw case 39 includes a supply path 39a corresponding to the supply path 21a of the first embodiment. The supply path 39a is coupled to the recess 39c through a passage port 39b. The passage port 39b corresponds to the passage port 21b of the first embodiment.

The flat screw 41 rotates about a screw rotation center 41d and the rotation shaft 22a of the motor 22. The flat screw 41 includes, on a groove forming surface 41a, first grooves 41b as spiral grooves corresponding to the first grooves 26b of the first embodiment. The groove forming surface 41a corresponds to the groove forming surface 26a of the first embodiment.

When viewed from the direction perpendicular to the rotation shaft 22a of the motor 22, the flat screw 41 includes a first side surface 41g in which a first supply port 41e as the supply port and a second supply port 41f as the supply port that supply the resin pellets 16 to the first grooves 41b are partially formed. The flat screw 41 includes a second side surface 41h formed on a side farther from the barrel 27 than the first side surface 41g. The first side surface 41g and the second side surface 41h have a circular shape when viewed from a direction along the screw rotation center 41d. The first side surface 41g and the second side surface 41h have the same radius around the screw rotation center 41d. The first side surface 41g faces the recess 39c. The screw case 39 includes a third side surface 39d facing the second side surface 41h. The screw case 39 includes a fourth side surface 39e facing the first side surface 41g.

A first distance 42, which is a shortest distance between the first side surface 41g and the screw case 39, is larger than a second distance 43, which is a shortest distance between the second side surface 41h and the screw case 39. The first distance 42 is a distance between the first side surface 41g and the fourth side surface 39e. The second distance 43 is a distance between the second side surface 41h and the third side surface 39d.

According to this configuration, the screw case 39 and the second side surface 41h of the flat screw 41 rotate relative to each other by the motor 22. The resin pellets 16 pass between the first side surface 41g and the recess 39c of the screw case 39 before entering the first supply port 41e and the second supply port 41f from the screw case 39. Since the first side surface 41g and the passage port 39b of the screw case 39 are separated from each other, it is possible to prevent the resin pellets 16 from being sandwiched and divided between the first side surface 41g of the flat screw 41 and the screw case 39. Therefore, since the resin pellets 16 are less likely to be crushed in the plasticizing device 38, it is possible to prevent the crushed resin pellets 16 from inhibiting the rotation of the flat screw 41.

The third side surface 39d protrudes further toward a flat screw 41 side than the fourth side surface 39e. Since the second distance 43 is small, the resin pellets 16 are less likely to move toward the screw support portion 25 side. Therefore, the flat screw 41 can flow the resin pellets 16 into the first grooves 41b.

Third Embodiment

A third embodiment describes an example of an injection molding device including the plasticizing device 14 of the first embodiment or the plasticizing device 38 of the second embodiment.

Figure 9:
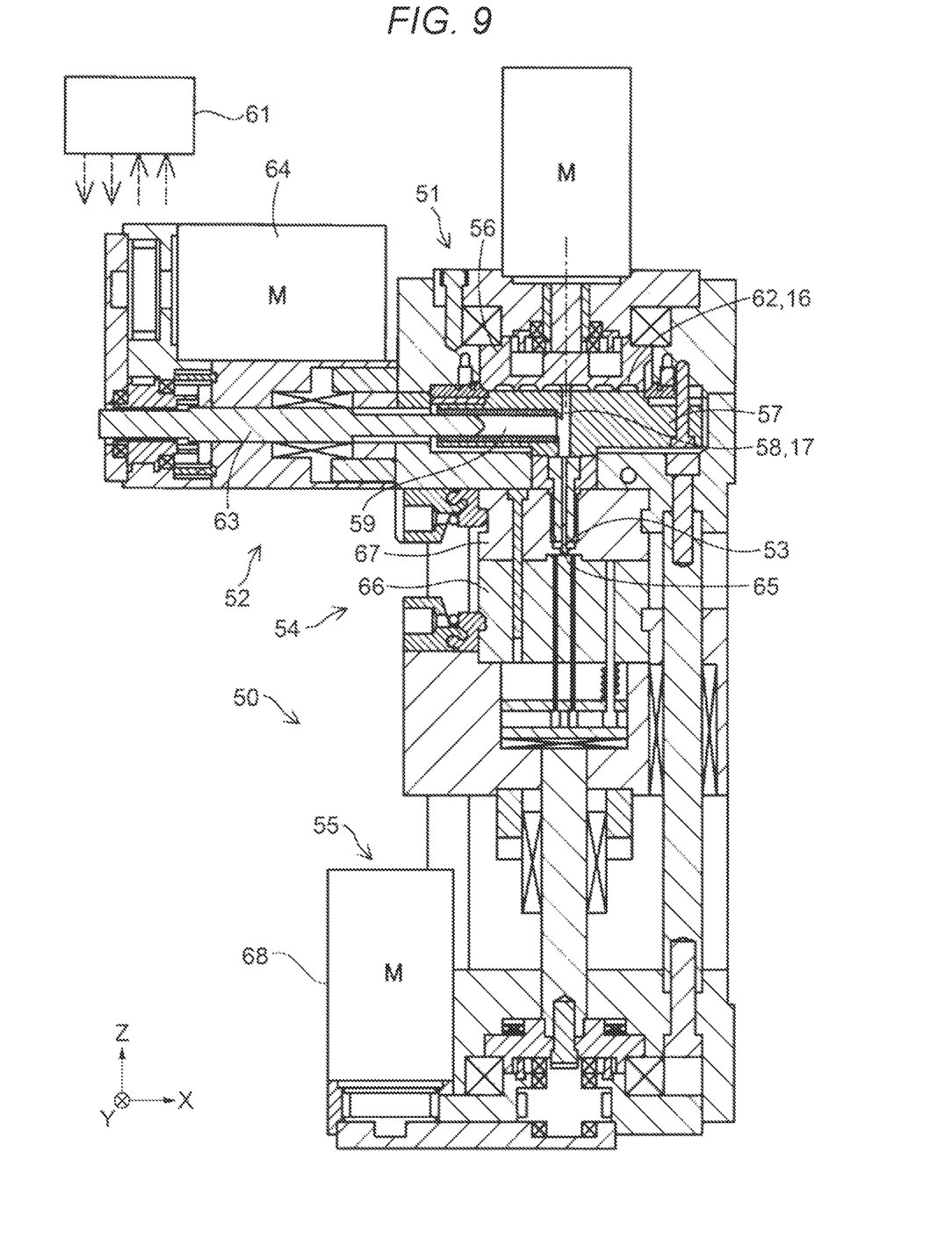
FIG. 9 is a schematic diagram showing a configuration of an injection molding device according to a third embodiment.

As shown in FIG. 9, the injection molding device 50 includes a plasticizing device 51, an injection control mechanism 52, a nozzle 53, a mold 54, and a mold clamping device 55. The plasticizing device 14 of the first embodiment or the plasticizing device 38 of the second embodiment is used for the plasticizing device 51.

The plasticizing device 51 includes a flat screw 56 and a barrel 57. An injection cylinder 59 is coupled to a communication hole 58 of the barrel 57. Under a control of a control unit 61, the plasticizing device 51 plasticizes the resin pellets 16 supplied to groove portions 62 of the flat screw 56, generates the pasty plasticizing material 17 having fluidity, and guides the plasticizing material 17 from the communication hole 58 to the injection control mechanism 52.

The injection control mechanism 52 includes the injection cylinder 59, a plunger 63, and a plunger drive unit 64. The injection control mechanism 52 injects the plasticizing material 17 in the injection cylinder 59 into a cavity 65. The injection control mechanism 52 controls an injection amount of the plasticizing material 17 from the nozzle 53 under the control of the control unit 61. The injection cylinder 59 is a substantially cylindrical member coupled to the communication hole 58 of the barrel 57, and includes the plunger 63 inside. The plunger 63 slides inside the injection cylinder 59, and pumps the plasticizing material 17 in the injection cylinder 59 to the nozzle 53 coupled to the plasticizing device 51. The plunger 63 is driven by the plunger drive unit 64 configured by the motor.

The mold 54 includes a movable mold 66 and a fixed mold 67. The movable mold 66 and the fixed mold 67 are provided to face each other, and the cavity 65, which is a space corresponding to a shape of a molded product, is formed between the movable mold 66 and the fixed mold 67. The plasticizing material 17 pumped by the injection control mechanism 52 is injected into the cavity 65 through the nozzle 53.

The mold clamping device 55 includes a mold drive unit 68. The mold drive unit 68 opens and closes the movable mold 66 and the fixed mold 67. Under the control of the control unit 61, the mold clamping device 55 drives the mold drive unit 68 to move the movable mold 66 to open and close the movable mold 66 and the fixed mold 67.

In the injection molding device 50, the plasticizing device 14 or the plasticizing device 38 is used for the plasticizing device 51. The injection molding device 50 includes the nozzle 53 that injects the plasticizing material 17 supplied from the plasticizing device 51 toward the mold 54.

According to this configuration, the injection molding device 50 includes the plasticizing device 14 or the plasticizing device 38 described above. Since the plasticizing device 14 and the plasticizing device 38 are less likely to crush the resin pellets 16, it is possible to prevent the crushed resin pellets 16 from inhibiting the rotation of the flat screw 56. Therefore, the injection molding device 50 can be the device including the plasticizing device 51 with high long-term reliability.

What is claimed is:

1. A plasticizing device, comprising:
   a motor;
   a screw assembly, the screw assembly being configured with:
      a reduction gear coupled to a rotation shaft of the motor to rotate around the rotation shaft, the reduction gear being configured to reduce a rotation speed, the reduction gear having an output shaft at a distal end thereof, the output shaft being located at an opposite side of the reduction gear with respect to the motor;
      a screw support component disposed at the output shaft of the reduction gear; and
      a flat screw disposed at an opposite side of the screw support component with respect to the reduction gear, the flat screw having a groove forming surface in which a spiral groove is formed and that rotates around a rotation axis by the output shaft of the reduction gear, a length of the flat screw in a first direction along the rotation axis is less than a length of the flat screw in a second direction perpendicular to the rotation axis;
   a barrel that has a facing surface facing the groove forming surface along the first direction and that is provided with a communication hole through which a plasticizing material flows, the plasticizing material being obtained by plasticizing material pellets;
   a material reservoir that stores the material pellets;
   a passage port that receives the material pellets from the material reservoir via a pipe connected between the material reservoir and the passage port;
   a heater that heats the material pellets supplied into the spiral groove; and
   a screw case that accommodates the screw assembly and that includes the passage port through which the material pellets pass toward the flat screw, wherein
   when viewed along the second direction, the flat screw has a first side surface in which a supply port for supplying the material pellets to the spiral groove is partially formed in a circumferential direction of the first side surface, and a second side surface formed on a side farther from the barrel than the first side surface,
   there is a space between the second side surface and an inner surface of the screw case,
   a first distance, which is a shortest distance between the first side surface and the inner surface of the screw case, is larger than a second distance, which is a shortest distance of the space between the second side surface and the inner surface of the screw case, and
   in the first direction, a first length of the passage port provided on the inner surface of the screw case is smaller than a second length from an upper surface of the barrel to a most closest point of the space.

2. The plasticizing device according to claim 1, wherein the first side surface is closer to the rotation axis than the second side surface.

3. The plasticizing device according to claim 1, wherein an area occupied by the first side surface is larger than an area occupied by the second side surface.

4. The plasticizing device according to claim 1, wherein the material pellets contain an elastomer resin.

5. The plasticizing device according to claim 1, further comprising:
   a seal that narrows a gap between the screw support component and the screw case.

6. A three-dimensional shaping device, comprising:
   the plasticizing device according to claim 1;
   a nozzle that discharges the plasticizing material supplied from the plasticizing device; and
   a stage that receives the plasticizing material discharged from the nozzle.

7. An injection molding device, comprising:
   the plasticizing device according to claim 1; and
   a nozzle that injects the plasticizing material supplied from the plasticizing device toward a mold.

8. The plasticizing device according to claim 1, wherein
   when viewed the groove forming surface along the first direction, the screw has a ring-shaped groove formed between an outer peripheral of the groove forming surface and the inner surface of the screw case, and
   the supply port is connected to the passage port via the ring-shaped groove, and the first side surface is a wall surface of the ring-shaped groove.

9. The plasticizing device according to claim 1, wherein
   the spiral groove includes a first portion continuous with the supply port and a second portion continuous with the first portion and farther from the supply port than the first portion, and
   a groove depth of the first portion is deeper than a groove depth of the second portion.

10. The plasticizing device according to claim 1, wherein a length of the supply port along the rotation axis is more than half a length of the first side surface along the rotation axis.

11. The plasticizing device according to claim 1, wherein when viewed the groove forming surface along the first direction, the screw case has a ring-shaped recess at a position facing the first side surface of the screw.

12. The plasticizing device according to claim 1, wherein when viewed along the second direction, the material reservoir is located above the motor, and the motor located above the screw.

13. The plasticizing device according to claim 1, wherein the supply port is not formed on the second side surface.

14. The plasticizing device according to claim 1, wherein the length of the flat screw in the second direction is shorter than a length of the screw support component in the second direction.

15. The plasticizing device according to claim 1, wherein when viewed along the second direction, the material reservoir and the motor are aligned along the rotation axis.

* * * * *